(12) United States Patent
Corbin et al.

(10) Patent No.: US 11,994,069 B2
(45) Date of Patent: May 28, 2024

(54) SYSTEM FOR COOLING AN AIRCRAFT TURBOJET ENGINE

(71) Applicant: Safran Nacelles, Gonfreville l'Orcher (FR)

(72) Inventors: Julien Corbin, Moissy Cramayel (FR); Jean-Nicolas Bouchout, Moissy Cramayel (FR); Caroline Dang, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 338 days.

(21) Appl. No.: 17/490,766

(22) Filed: Sep. 30, 2021

(65) Prior Publication Data
US 2022/0186665 A1    Jun. 16, 2022

Related U.S. Application Data

(63) Continuation of application No. PCT/EP2020/058632, filed on Mar. 26, 2020.

(30) Foreign Application Priority Data

Apr. 3, 2019 (FR) ...................................... 19/03545

(51) Int. Cl.
*F02C 7/14* (2006.01)
*F02K 1/56* (2006.01)

(52) U.S. Cl.
CPC .................. *F02C 7/14* (2013.01); *F02K 1/56* (2013.01); *F05D 2220/323* (2013.01);
(Continued)

(58) Field of Classification Search
CPC ...... F02C 7/14; F02C 7/18; F02K 1/56; F02K 1/72; F05D 2220/323; F05D 2250/41;
(Continued)

(56) References Cited

U.S. PATENT DOCUMENTS 5,370,427 A * 12/1994 Hoelle .................... F16L 27/11
285/226
2010/0212857 A1* 8/2010 Bulin ...................... F02C 7/224
165/41
(Continued)

FOREIGN PATENT DOCUMENTS

| EP | 1895124 | 3/2008 |
| FR | 3054856 | 2/2018 |
| WO | 2018015659 | 1/2018 |

OTHER PUBLICATIONS

International Search Report for International Application PCT/EP2020/058632, dated Jul. 14, 2020.

*Primary Examiner* — Yi-Kai Wang
(74) *Attorney, Agent, or Firm* — Burris Law, PLLC

(57) ABSTRACT

An engine nacelle, for a turbojet engine of the type having a lubricant, includes a cooling system. The cooling system includes a cold source heat-exchanger, configured to exchange heat between a heat-transfer fluid and air, a heat-transfer fluid inlet duct leading into the cold source heat-exchanger, and a heat-transfer fluid outlet duct leading out of the cold source heat-exchanger. The inlet and outlet ducts are configured to form a recirculation loop between the cold source heat-exchanger and a hot source heat-exchanger, configured to exchange heat between the heat-transfer fluid and the lubricant. The cold source heat-exchanger is arranged on a movable surface of the nacelle with respect to the hot source heat-exchanger and the heat-transfer fluid inlet and outlet ducts are extendable and/or flexible to permit the relative movement between the cold source heat-exchanger and the hot source heat-exchanger.

13 Claims, 5 Drawing Sheets

(52) U.S. Cl.
CPC .... *F05D 2250/41* (2013.01); *F05D 2260/205* (2013.01); *F05D 2260/213* (2013.01); *F05D 2260/98* (2013.01)

(58) Field of Classification Search
CPC ......... F05D 2260/205; F05D 2260/213; F05D 2260/98; F05D 2260/50; F28F 2265/26; F28F 9/26; Y02T 50/60
USPC ........................................................ 415/177
See application file for complete search history.

(56) References Cited

U.S. PATENT DOCUMENTS

| | | | |
|---|---|---|---|
| 2015/0192033 A1* | 7/2015 | Garassino | F01M 5/00 62/468 |
| 2016/0114898 A1* | 4/2016 | Llamas Castro | F02C 7/047 415/177 |
| 2016/0245180 A1 | 8/2016 | Todorovic et al. | |

* cited by examiner

SYSTEM FOR COOLING AN AIRCRAFT TURBOJET ENGINE

CROSS-REFERENCE TO RELATED APPLICATIONS

This application is a continuation of International Application No. PCT/EP2020/058632, filed on Mar. 26, 2020, which claims priority to and the benefit of FR 19/03545 filed on Apr. 3, 2019. The disclosures of the above applications are incorporated herein by reference.

FIELD

The present disclosure relates to the field of systems for cooling an aircraft turbojet engine.

BACKGROUND

The statements in this section merely provide background information related to the present disclosure and may not constitute prior art.

An aircraft can be propelled by one or several propulsion units each including a turbojet engine housed within a nacelle. Each propulsion unit is typically attached to the aircraft by a pylon that is generally located underneath or over a wing or at the level of the fuselage of the aircraft.

A nacelle generally has a tubular structure including an upstream section including an air inlet upstream of the turbojet engine, a middle section configured to surround a fan of the turbojet engine, a downstream section adapted to accommodate a thrust reverser and configured to surround the combustion chamber of the turbojet engine, and generally terminates in an ejection nozzle having an outlet that is located downstream of the turbojet engine.

Furthermore, a nacelle typically includes an outer structure including a fixed portion and a movable portion (e.g., thrust reverser), and an Inner Fixed Structure (IFS) concentric with the outer structure. The IFS surrounds the core of the turbojet engine at the rear of the fan. These outer and inner structures define an annular flow path, also called a secondary flow path, configured to channel an air stream, referred to as a secondary air stream or cold air stream, which circulates outside the turbojet engine.

The outer structure includes an outer fairing defining an outer aerodynamic surface, configured to be in contact with an outer air stream, and an inner fairing defining an inner aerodynamic surface, configured to be in contact with the secondary air stream. The inner and outer fairings are connected upstream by a leading edge wall forming an air inlet lip.

The thrust reverser permits redirecting all or part of the cold air stream circulating in the secondary flow path of the nacelle forwards of the propulsion unit so as to create a counter-thrust participating in braking the aircraft.

Such a thrust reverser includes thrust reversal movable structures, typically two thrust reversal movable structures, carried by the nacelle so as to be displaced between a closure position (also referred to as "direct jet") in which the thrust reverser is inactive, and an opening position (also referred to as "reverse jet") in which the thrust reverser is active. In the opening position, the thrust reverser returns at least one portion of the cold air stream in the reverse direction of the stream generated by the turbojet engine. In particular, there are known thrust reversers whose movable structures are displaced in translation along an axial direction of the turbojet engine during their switch into the opening position. Such thrust reversers are known as cascade thrust reversers.

In the reverse jet position, the thrust reverser returns at least one portion of the cold air stream in the reverse direction of the stream generated by the turbojet engine.

In general, the turbojet engine includes a set of blades (e.g., compressor and possibly unducted fan or propeller) driven in rotation by a gas generator through a set of transmission components.

A system for dispensing a lubricant is provided in the turbojet engine to ensure a proper lubrication of these transmission components and to cool them.

The lubricant is an oil. In the following description, the terms lubricant and oil will be used interchangeably.

A cooling system including at least one heat-exchanger permits cooling the lubricant.

There are cooling systems including an air/oil heat-exchanger using cold air sampled in the secondary flow path of the nacelle or in one of the first compressor stages to cool down the oil of the turbojet engine. Such a heat-exchanger includes of a fin heat-exchanger. It includes fins in the cold air stream which disturb the flow of the air stream in the secondary flow path or in the compressor, which generates pressure drops (e.g., thrust), and therefore losses of performances of the aircraft in terms of fuel consumption (e.g., Fuel Burn ("FB") parameter).

There are also cooling systems including an air/oil heat-exchanger using cold air sampled outside the nacelle or in the secondary flow path through a scoop disposed respectively on the outer or inner fairing of the nacelle, the cold air being brought to circulate through the heat-exchanger and may be used in deicing of the nacelle, once heated up by the lubricant, by circulation in conduits disposed in contact with the walls of the outer structure of the nacelle, for example at the level of the air inlet lip. Such a cooling system permits for improved control of the exchanger thermal energies, but the presence of scoops in the outer or inner fairing of the nacelle generates a loss of aerodynamic performances, in the same manner as a fin heat-exchanger, and therefore losses of performances of the aircraft in terms of fuel consumption (Fuel Burn ("FB") parameter).

A known solution for limiting the disturbances of the air stream that generate the losses of performances in terms of fuel consumption of the aircraft, includes providing a cooling system including a hot source heat-exchanger, between a heat-transfer fluid and the engine oil, and a cold source heat-exchanger, between the heat-transfer fluid and air. Such a cooling system includes a heat-transfer fluid circulation conduit in a closed circuit. More particularly, the heat-transfer fluid circulation conduit incudes a portion disposed in the nacelle includes a portion disposed in the nacelle in contact with the outer and/or inner fairing, the portion forming the cold source heat-exchanger. This is typically referred to as a surface heat-exchanger. Still more particularly, the portion disposed in the nacelle in contact with the inner and/or outer fairing includes a plurality of channels disposed in parallel, the channels being formed by a double wall of the inner and/or outer fairing. This is then referred to as a structural heat-exchanger.

In general, the cold source heat-exchangers are located on the fixed portion of the outer and/or inner structure of the nacelle and/or on a fixed portion of the turbojet engine of the aircraft, such as on cowls of the turbojet engine or on the air inlet of the nacelle.

SUMMARY

This section provides a general summary of the disclosure and is not a comprehensive disclosure of its full scope or all of its features.

In order to improve the cooling performances of the turbojet engine, it can be beneficial to use other heat-exchange surfaces, besides those on fixed portions, for cooling the heat-transfer fluid, such as surfaces of the movable portion. For example, it can be advantageous to use the trailing edge located at the rear of the movable structures of the thrust reverser. Thus, the present disclosure provides a nacelle including a cooling system adapted to follow the relative movement of a movable surface relative to a fixed surface.

To this end, the teachings of the present disclosure include a nacelle for a turbojet engine of the type including a lubricant, the nacelle including an outer structure and an inner structure defining an annular flow path for the flow of a secondary air stream (also referred to as a cold air stream), the outer structure including an outer fairing defining an outer aerodynamic surface and an inner fairing defining an inner aerodynamic surface, the outer and inner fairings being connected upstream by a leading edge wall forming an air inlet lip, said nacelle including a cooling system including: at least one heat-exchanger, also referred to as a cold source heat-exchanger, between a heat-transfer fluid and air, a heat-transfer fluid inlet conduit into the cold source heat-exchanger, a heat-transfer fluid outlet conduit out of the cold source heat-exchanger, the inlet and outlet conduits being configured to form a recirculation loop between the cold source heat-exchanger and a heat-exchanger between the heat-transfer fluid and the lubricant, also referred to as a hot source heat-exchanger, the cold source heat-exchanger being disposed on a movable surface of the nacelle relative to the hot source heat-exchanger, and the heat-transfer fluid inlet and outlet conduits being extendable and/or flexible to permit accommodation of the relative movement between the two heat-exchangers.

The nacelle according to the present disclosure includes the heat-transfer fluid inlet and outlet conduits being adapted to permit a relative movement between two heat-exchangers disposed on surfaces that are relative to one another. Thus, the hot source heat-exchanger may be arranged on a fixed surface of the nacelle or of the turbojet engine whereas the cold source heat-exchanger is arranged on a movable surface of the nacelle such as a thrust reverser.

By movable surface of the nacelle, it should be understood as a surface adapted to perform a displacement relative to a fixed surface of the nacelle and/or relative to a fixed surface of the turbojet engine.

According to other features of the present disclosure, the nacelle includes one or more of the following optional features considered separately or according to any possible combination.

According to one feature, the cold source heat-exchanger is a surface heat-exchanger constituted for example by a portion of the heat-transfer fluid circulation conduit, disposed in contact with the inner and/or outer fairing of the nacelle.

According to one feature, the heat-transfer fluid inlet and outlet conduits include at least one deployable device intended to accommodate the relative movement between the two heat-exchangers.

According to one form, the deployable device is a telescopic tube.

The telescopic tube ensures both the dynamic sealing function with regards to the circulation of the heat-transfer fluid and also the guide function of the circulation conduits.

According to one feature, the telescopic tube is a telescopic tube including several stages.

Alternatively, the telescopic tube is a telescopic tube including one single stage. This is referred to as one-stage telescopic tube.

According to one feature, the telescopic tube is rigid.

According to one feature, the telescopic tube is made of a metallic material such as stainless steel, Inconel, aluminum or titanium.

According to one feature, the telescopic tube is made of a polymer material such as polyetheretherketone (PEEK), polytetrafluoroethylene (PTFE) or a thermoplastic material.

In another form, the deployable device is a bellow device.

By bellow device, it should be understood as a retractable device ensuring sealing of the heat-transfer fluid without resorting to parts that are movable relative to one another.

The bellow device ensures the sealing function without requiring dynamic sealing with regards to the circulation of the heat-transfer fluid. Furthermore, the bellow device is merely sensitive to misalignments between the fixed and movable structures.

According to one feature, the bellow device is soft.

According to one feature, the bellow device is flexible.

According to one feature, the bellow device is made of a metallic material such as stamped stainless steel.

According to one feature, the bellow device is made of a polymer material such as polyetheretherketone (PEEK), polytetrafluoroethylene (PTFE), rubber or a thermoplastic material.

Advantageously, the nacelle includes a guide system configured to guide the movability of the bellow device.

The presence of the guide device avoids buckling of the bellow.

According to one feature, the guide system is a tube including at least two portions configured to slide into one another. The tube may be arranged inside the bellow device or outside the bellow device.

In one variant form, the guide system is of the rail/slide type.

A rail/slide type guide system includes a rail and a slide which cooperate together.

In another form, the deployable device is a flexible device adapted to be wound on itself and to be unwound to accommodate the relative movement between the two heat-exchangers. The deployable device is wound by a winding device.

According to one feature, the wound conduit is soft.

According to one feature, the wound conduit is flexible.

According to one feature, the wound conduit is made of a polymer material such as polytetrafluoroethylene (PTFE). The conduit may be covered with a braided sheath made of a metallic material such as stainless steel or non-metallic such as Nomex® sheaths.

According to one feature, the nacelle includes at least one thrust reverser, and the cooling system includes a first heat-exchanger, also referred to as a hot source heat-exchanger, between a heat-transfer fluid and a lubricant for the turbojet engine, a second heat-exchanger, corresponding to the cold source heat-exchanger, between the heat-transfer fluid and air, the second cold source heat-exchanger being movable relative to the first hot source heat-exchanger and the heat-transfer fluid inlet and outlet conduits being extendable and/or flexible to permit accommodating the relative movement between the two heat-exchangers, the cold source heat-exchanger being disposed in the thrust reverser.

According to one feature, the cold source heat-exchanger is a structural heat-exchanger integral with the nacelle.

By structural heat-exchanger, it should be understood as a heat-exchanger formed integrally with the nacelle, that is to say having heat-transfer fluid circulation conduits formed by a double wall of the inner and/or outer fairing of the nacelle.

By double wall of the fairing, it should be understood that at least one portion of the wall of the heat-transfer fluid circulation conduits is formed by the outer or inner fairing of the nacelle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
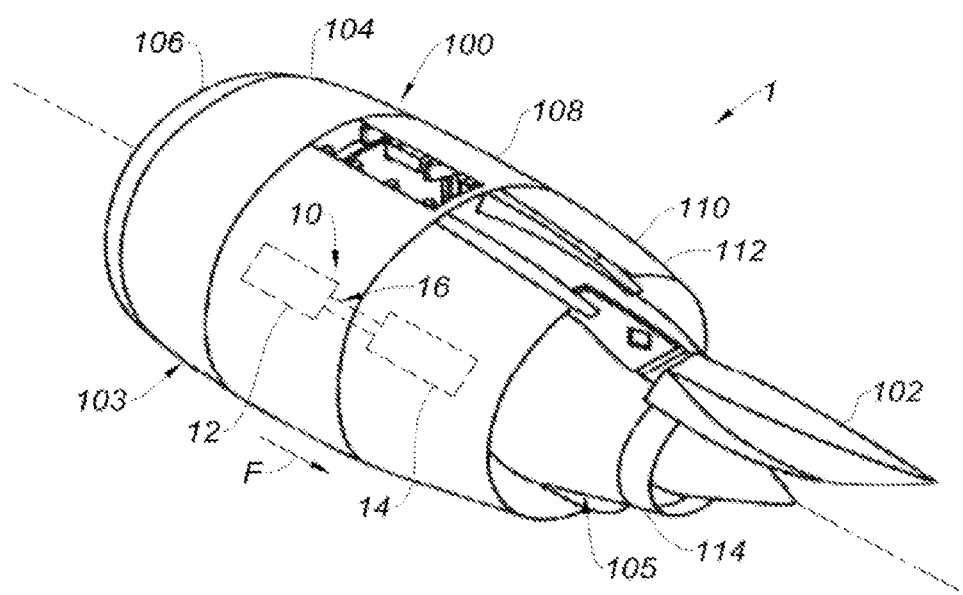
FIG. 1 is a schematic perspective view of a propulsion unit with a thrust reverser including a cooling system according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

For simplicity, identical elements bear identical reference numerals in all figures.

FIG. 1 represents an aircraft propulsion unit 1. This propulsion unit 1 includes a nacelle 100, a reactor pylon 102 and a turbojet engine (not represented) housed within the nacelle 100. The reactor pylon 102 is configured to be fastened to a wing (not represented) or to the fuselage (not represented) of the aircraft.

The nacelle 100 has a tubular structure including an upstream section 104 provided with a lip 106 forming an air inlet, a middle section 108 configured to surround a turbojet engine fan (not represented), a downstream section 110 including a thrust reverser 112 and configured to surround the combustion chamber of the turbojet engine (not represented), and an ejection nozzle 114 whose outlet is located downstream of the turbojet engine (not represented).

Furthermore, the nacelle 100 includes an outer structure 103 and an inner structure 105, called Inner Fixed Structure (IFS), concentric with the outer structure 103. The outer structure 103 and the inner structure 105 define an annular flow path, also called secondary flow path or cold air flow path, configured to channel a cold air stream F that circulates outside the turbojet engine (not represented).

The thrust reverser 112 is illustrated in the direct jet position. The thrust reverser 112 includes a sliding cowl movable in translation between the direct jet position and the reverse jet position (FIGS. 3 to 14).

Figure 2:
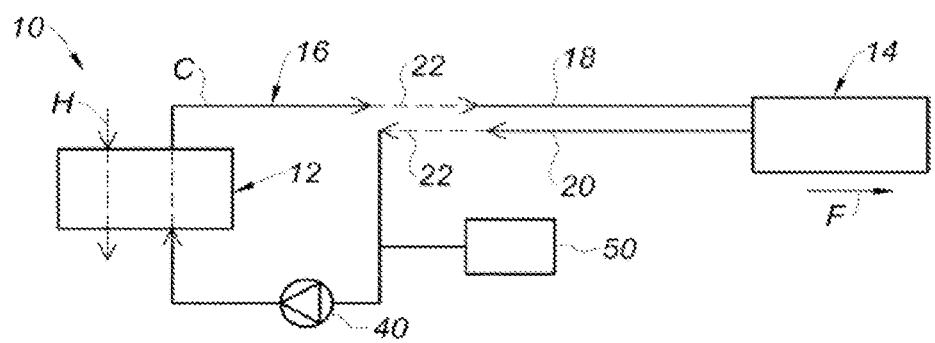
FIG. 2 is a schematic view of the cooling system of FIG. 1 for cooling a turbojet engine of the propulsion unit of FIG. 1.

The nacelle 100 includes a system 10 for cooling the turbojet engine (not represented). The cooling system 10 includes a first heat-exchanger 12, also referred to as a hot source heat-exchanger, between a heat-transfer fluid C (FIG. 2) and a lubricant H (FIG. 2) of the turbojet engine, a second heat-exchanger 14, also referred to as a cold source heat-exchanger, between the heat-transfer fluid C (FIG. 2) and air F, and a heat-transfer fluid C circulation conduit 16 (FIG. 2).

The cold source heat-exchanger 14 is disposed on the sliding cowl of the thrust reverser 112 and the hot source heat-exchanger 12 is disposed on the middle section 108. Thus, the cold source heat-exchanger 14 is movable relative to the hot source heat-exchanger 12.

According to a non-represented form, the hot-source heat-exchanger 12 may be disposed on a surface of the turbojet engine.

The cold source heat-exchanger 14 includes a structural surface heat-exchanger integral with the sliding cowl of the thrust reverser 112. It includes a plurality of conduits (not represented) formed by a double wall of the sliding cowl of the thrust reverser 112.

As illustrated in FIG. 2, the circulation conduit 16 is extendable so as to accommodate the relative movement between the two heat-exchangers 12, 14 during the switch of the sliding cowl from the direct jet position into the reverse jet position.

The extendable circulation conduit 16 is configured so as to perform a translational stroke between 300 mm and 1000 mm.

The cooling system 10 is configured so as to withstand a service pressure included between 0 and 10 bars.

FIG. 2 represents the cooling system 10 including the hot source heat-exchanger 12 between the heat-transfer fluid C and the lubricant H, the cold source heat-exchanger 14, between the heat-transfer fluid C and air F, and the heat-transfer fluid circulation conduit 16.

The heat-transfer fluid circulation conduit 16 is a closed circuit. The heat-transfer fluid circulation conduit 16 includes a heat-transfer fluid inlet conduit 18 into the cold source heat-exchanger 14, and a heat-transfer fluid outlet conduit 20 out of the cold source heat-exchanger 14. The inlet conduit 18 and the outlet conduit 20 form a recirculation loop between the cold source heat-exchanger 14 and the hot source heat-exchanger 12.

The heat-transfer fluid inlet conduit 18 and the outlet conduit 20 include at least one deployable device 22 configured to accommodate the relative movement between the two heat-exchangers 12, 14.

The cooling system 10 includes at least one circulation pump 40 intended to make the heat-transfer fluid C circulate.

The cooling system 10 also includes an expansion vessel 50 configured to accommodate volume variation of the heat-transfer fluid C by the effect of temperature.

The expansion vessel 50 is a closed tank. Thus, the pressure in the expansion vessel 50 is directly related to the volume occupied by the heat-transfer fluid C in the expansion vessel. This feature can permit controlling a maximum and/or minimum pressure in some portions of the circulation conduit 16 of the heat-transfer fluid C by acting only on the capacity (i.e., volume) of the expansion vessel 50.

Figure 3:
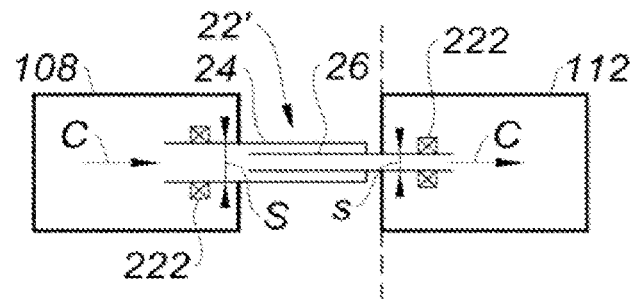
FIG. 3 is a schematic cross-sectional view of a first form of a deployable device of the cooling system of FIG. 1 according to a first construction illustrated in a retracted position, in accordance with the teachings of the present disclosure.
Figure 4:
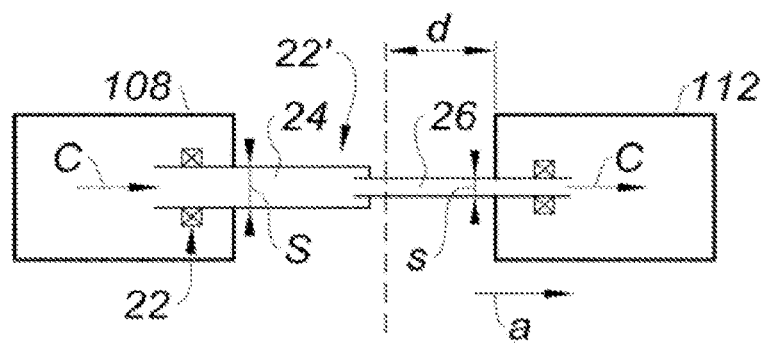
FIG. 4 is a schematic cross-sectional view of the deployable device of FIG. 3 illustrated in a deployed position.

FIGS. 3 and 4 represent the deployable device 22' according to a first construction of a first form. In this first form, the deployable device 22' is a telescopic tube and more specifically, in this first construction, the telescopic tube 22' has one single stage in the retracted position (FIG. 3) and in the deployed position (FIG. 4) between a middle section 108 and a sliding cowl of a thrust reverser 112 of a nacelle 100 (FIG. 1).

The telescopic tube 22' includes a first channel 24 one end of the ends thereof is fastened to the middle section 108 by a mechanical fastener 222 and a second channel 26 one of the ends thereof is fastened to the sliding cowl of the thrust reverser 112 by a mechanical fastener 222. The mechanical fasteners 222 may be a ball-joint or a universal joint. The first channel 24 has a section S larger than the section s of the second channel 26 so that the second channel 26 is adapted to retract into the first channel 24.

In operation, the second channel 26 is retracted into the first channel 24 when the thrust reverser 112 is in the direct jet position (FIG. 3), and the second channel 26 is extended out of the first channel 24 a greater extent when the thrust reverser 112 is in the reverse jet position (FIG. 4) according to a spacing d formed by the displacement of the sliding cowl of the thrust reverser 112. The second channel 26 is movable in translation along the direction of the arrow a corresponding to the direction of translation of the thrust reverser 112. Thus, the cooling system 10 accommodates the displacement of the cold source heat-exchanger 14 relative to the hot source heat-exchanger 12 and permits the heat-transfer fluid C to circulate in the telescopic tube 22' during the changes in the position of the thrust reverser.

Figure 5:
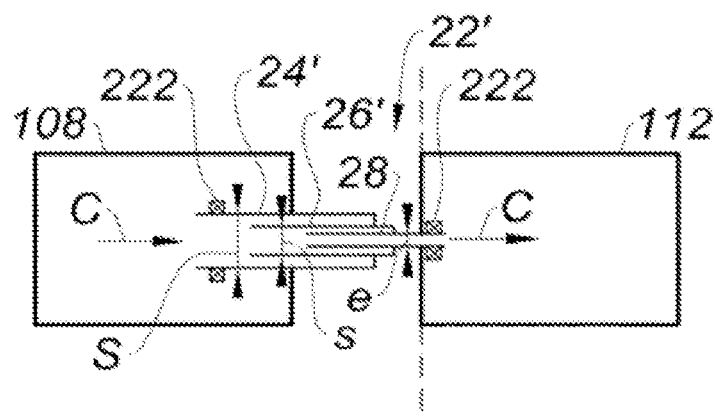
FIG. 5 is a schematic cross-sectional view of the first form of the deployable device of the cooling system of FIG. 1 according to a second construction illustrated in a retracted position, in accordance with the teachings of the present disclosure.
Figure 6:
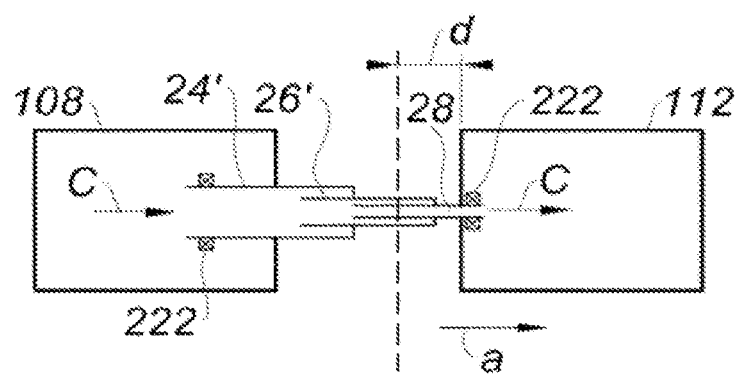
FIG. 6 is a schematic cross-sectional view of the deployable device of FIG. 5 illustrated in a deployed position.

FIGS. 5 and 6 represent the deployable device 22' according to a second construction of the first form, wherein the deployable device 22' is a telescopic tube with several stages. In this example, the deployable device 22' is a telescopic tube with three stages, in the retracted position (FIG. 5) and in the deployed position (FIG. 6) between the middle section 108 and the sliding cowl of the thrust reverser 112 of a nacelle 100 (FIG. 1).

The telescopic tube includes a first channel 24' one of the ends thereof is fastened to the middle section 108 by a mechanical fastener 222, a second channel 26' and a third channel 28 one of the ends thereof is fastened to the sliding cowl of the thrust reverser 112 by a mechanical fastener 222. The mechanical fasteners 222 may be a ball-joint or a universal joint. The first channel 24' has a section S' larger than the section s' of the second channel 26' so that the second channel 26' is adapted to retract into the first channel 24', and the second channel 26' has a section s' larger than the section e of the third channel 28 so that the third channel 28 is adapted to retract into the second channel 26'.

In operation, the second channel 26' is retracted into the first channel 24' and the third channel 28 is retracted into the second channel 26' when the thrust reverser 112 is in the direct jet position (FIG. 5), and the second channel 26' is extended out of the first channel 24' and the third channel 28 is extended out of the second channel 26' greater extents when the thrust reverser 112 is in the reverse jet position (FIG. 6) according to a spacing d formed by the displacement of the movable cowl of the thrust reverser 112. The second 26' and third 28 channels are movable in translation along the direction of the arrow a corresponding to the direction of translation of the thrust reverser 112. Thus, the cooling system 10 accommodates the displacement of the cold source heat-exchanger 14 relative to the hot source heat-exchanger 12 and permits the heat-transfer fluid C to circulate in the telescopic tube during the changes in the position of the thrust reverser 112.

Figure 7:
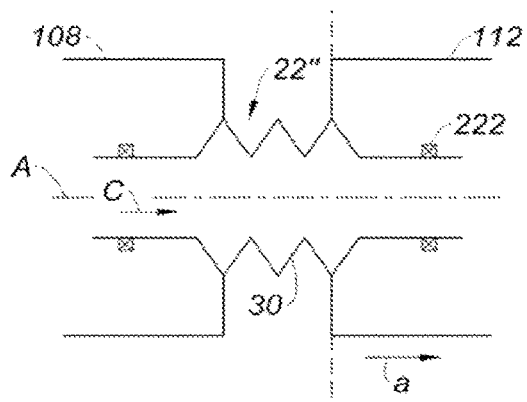
FIG. 7 is a schematic cross-sectional view of a second form of a deployable device of the cooling system of FIG. 1, in accordance with the teachings of the present disclosure.

FIG. 7 represents the deployable device 22" according to a second form. In this second form, the deployable device 22" is a bellow device.

The bellow device 22" has an accordion-like structure including a plurality of sections 30. One end of the bellow device 22" is fastened to the middle section 108 by a mechanical fastener 222 and the opposite end of the bellow device 22" is fastened to the sliding cowl of the thrust reverser 112 by a mechanical fastener 222.

The bellow device 22" has an axisymmetric axis A.

In operation, the bellow device 22" is retracted when the thrust reverser 112 is in the direct jet position, and deployed when the thrust reverser 112 is in the reverse jet position.

The deployment of the bellow device 22" follows a translational displacement along the direction of the arrow a corresponding to the direction of translation of the thrust reverser 112.

Figure 8:
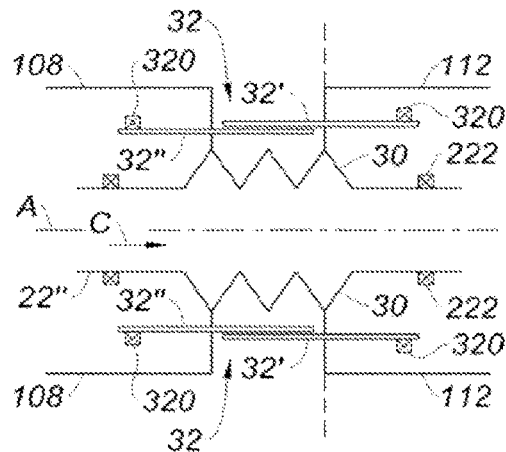
FIG. 8 is a schematic cross-sectional view of the second form of the deployable device of FIG. 7 including a guide device according to a first construction, illustrated in a retracted position, in accordance with the teachings of the present disclosure.
Figure 9:
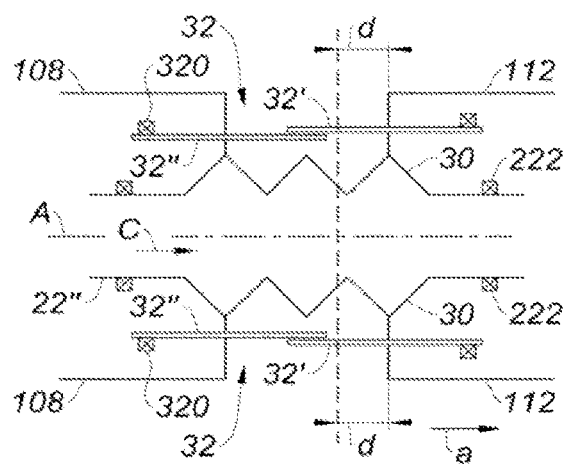
FIG. 9 is a schematic cross-sectional view of the deployable device of FIG. 8 illustrated in a deployed position.

FIGS. 8 and 9 represent the bellow device 22" and a guide device 32 according to a first construction.

The guide device 32 guides the deployment and the retraction of the bellow device 22" and inhibits buckling of the bellow device during the switch of the thrust reverser 112 into the direct jet position. The guide device 32 is a tube including at least two portions which, in the example provided, include a first portion 32' and a second portion 32", configured so as to slide into one another.

The first portion 32' has one end fastened to the sliding cowl of the thrust reverser 112 by a mechanical fastener 320 and an opposite end slidably fastened to the second portion 32'.

The second portion 32" has one end fastened to the movable cowl of the thrust reverser 112 by a mechanical fastener 320 and an opposite end slidably fastened to the first portion 32'.

Thus, the first portion 32' and the second portion 32" are configured so as to slide into one another.

In this first construction, the bellow device 22" is arranged inside the tube 32.

Figure 10:
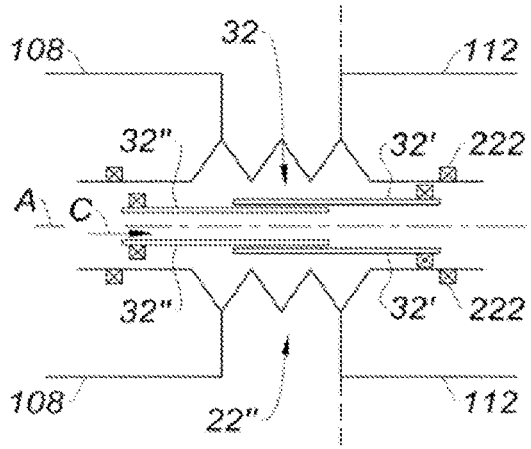
FIG. 10 is a schematic cross-sectional view of the second form of the deployable device of FIG. 7 including a guide device according to a second construction, illustrated in a retracted position, in accordance with the teachings of the present disclosure.
Figure 11:
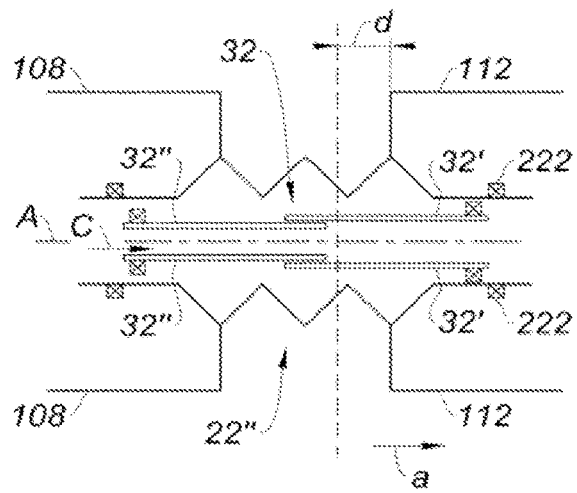
FIG. 11 is a schematic cross-sectional view of the deployable device of FIG. 10 illustrated in a deployed position.

In a second construction, the tube 32 as described before is arranged inside the bellow device 22", as shown in FIGS. 10 and 11.

Figure 12:
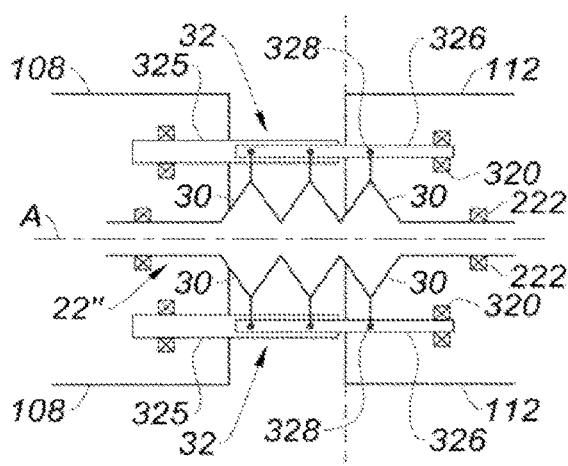
FIG. 12 is a schematic cross-sectional view of the second form of the deployable device of FIG. 7 including a guide according to a third construction illustrated in a retracted position, in accordance with the teachings of the present disclosure.
Figure 13:
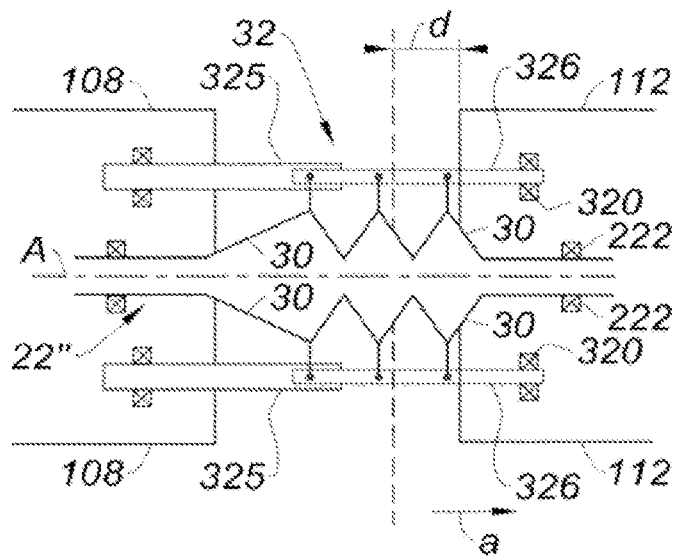
FIG. 13 is a schematic cross-sectional view of the deployable device of FIG. 12 illustrated in a retracted position.

FIGS. 12 and 13 illustrate the bellow device 22" and a guide device 32 according to a third construction. In this variant, the guide device 32 includes a slide 326 and a rail 325.

Each section 30 of the bellow device 22" is linked to the slide 326. The slide 326 is retracted into the rail 325 when the thrust reverser 112 is in the direct jet position (FIG. 12) and is extended out of the rail 325 further when the thrust reverser 112 is in the reverse jet position (FIG. 13) according to a spacing d formed by the displacement of the movable cowl of the thrust reverser 112. The bellow device 22" and the guide device 32 extend in translation along the direction of the arrow a corresponding to the direction of translation of the thrust reverser.

In a non-represented construction, only some sections 30 of the bellow device 22" are linked to the slide 326.

Figure 14:
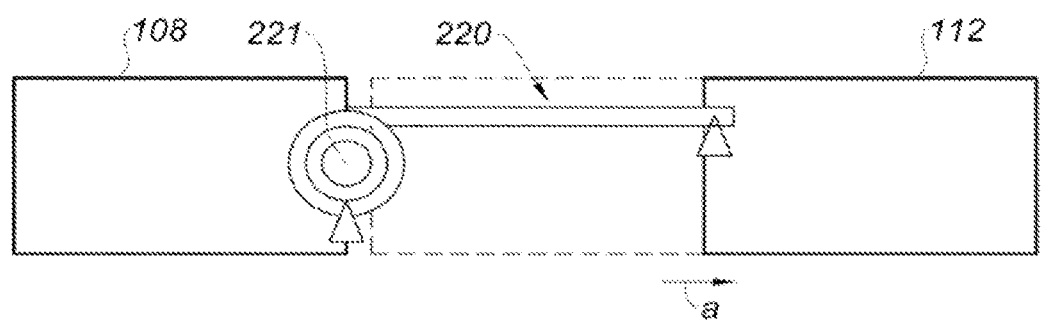
FIG. 14 is a schematic cross-sectional view of a third form of a deployable device of the cooling system of FIG. 1, in accordance with the teachings of the present disclosure.

FIG. 14 represents the deployable device 220 according to a third form. In this third form, the deployable device 220 is a flexible conduit adapted to be wound on itself and to be unwound to accommodate the relative movement between the two heat-exchangers 12, 14.

In operation, the flexible conduit 220 is wound when the thrust reverser 112 is in the direct jet position, and unwound when the thrust reverser 112 is in the reverse jet position. The flexible conduit 220 is wound by a winding device 221. Guidance of the flexible conduit 220 is ensured by tensioning the flexible conduit 220 at the level of the winding device 221 and permits an optimum winding of the flexible conduit 220 during the switch of the thrust reverser 112 into the direct jet.

In the different forms described above, the nacelle 100 has extendable inlet and outlet conduits which permit accommodating the relative movement of a movable surface relative to a fixed surface.

In a non-represented construction, the circulation conduit is flexible so as to accommodate the relative movement between the two heat-exchangers during the switch from the direct jet position into the reverse jet position of the sliding cowl.

It should be understood that the invention is not limited to the examples described herein and the teachings of the present disclosure could apply to other arrangements without departing from the scope of the teachings of the present disclosure. In particular, the different features, shapes, variants and forms of the disclosure may be associated together according to various combinations to the extent that they are not incompatible and do not exclude one another.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A nacelle for a turbojet engine, the nacelle comprising:
an outer structure and an inner structure defining an annular flow path configured to direct a secondary air stream, the outer structure comprising an outer fairing defining an outer aerodynamic surface and an inner fairing defining an inner aerodynamic surface, the outer fairing and the inner fairing being connected upstream by a leading edge wall forming an air inlet lip;
a thrust reverser; and
a cooling system comprising:
a first heat-exchanger configured to exchange heat between a heat-transfer fluid and a lubricant of the turbojet engine;
a second heat-exchanger configured to exchange heat between the heat-transfer fluid and air;
a heat-transfer fluid inlet conduit configured to permit the heat-transfer fluid to flow into the second heat-exchanger; and
a heat-transfer fluid outlet conduit configured to permit the heat-transfer fluid to flow out of the second heat-exchanger,
wherein the heat-transfer fluid inlet conduit and the heat-transfer fluid outlet conduit are configured to form a recirculation loop between the second heat-exchanger and the first heat-exchanger,
wherein the second heat-exchanger is movable relative to the first heat-exchanger and is disposed in the thrust reverser, and the heat-transfer fluid inlet conduit and the heat-transfer fluid outlet conduit are extendable, flexible, or extendable and flexible to accommodate the relative movement between the first heat-exchanger and the second heat-exchanger.

2. The nacelle according to claim 1, wherein the second heat-exchanger is a surface heat-exchanger.

3. The nacelle according to claim 2, wherein the heat-transfer fluid inlet conduit and the heat-transfer fluid outlet conduit comprise a deployable device configured to accommodate the relative movement between the first heat-exchanger and the second heat-exchanger.

4. The nacelle according to claim 3, wherein the deployable device is a telescopic tube.

5. The nacelle according to claim 4, wherein the telescopic tube comprises several stages.

6. The nacelle according to claim 4, wherein the telescopic tube comprises one single stage.

7. The nacelle according to claim 3, wherein the deployable device is a bellow device.

8. The nacelle according to claim 7 further comprising a guide system configured to guide the movement of the bellow device.

9. The nacelle according to claim 8, wherein the guide system is a tube comprising at least two portions configured so as to slide into one another.

10. The nacelle according to claim 8, wherein the guide system includes a rail and a slide.

11. The nacelle according to claim 3, wherein the deployable device is a flexible conduit adapted to be wound on itself and to be unwound to accommodate the relative movement between the first heat-exchanger and the second heat-exchanger.

12. The nacelle according to claim 1, wherein the second heat-exchanger is a structural heat-exchanger integral with the nacelle.

13. The nacelle according to claim 1, wherein the heat-transfer fluid inlet conduit and the heat-transfer fluid outlet conduit comprise a deployable device configured to accommodate the relative movement between the first heat-exchanger and the second heat-exchanger.

\* \* \* \* \*